(12) United States Patent
Crouch et al.

(10) Patent No.: US 12,522,378 B1
(45) Date of Patent: Jan. 13, 2026

(54) DEPLOYABLE SYSTEM FOR SPACE DEBRIS COLLECTION

(71) Applicant: Raytheon Company, Arlington, VA (US)

(72) Inventors: David D. Crouch, Farragut, TN (US); Nathan T. Potratz, Marion, IA (US)

(73) Assignee: RAYTHEON COMPANY, Arlington, VA (US)

( * ) Notice: Subject to any disclaimer, the term of this patent is extended or adjusted under 35 U.S.C. 154(b) by 0 days.

(21) Appl. No.: 19/079,750

(22) Filed: Mar. 14, 2025

(51) Int. Cl.
*B64G 1/10* (2006.01)
*B64G 1/22* (2006.01)

(52) U.S. Cl.
CPC ........... *B64G 1/1081* (2023.08); *B64G 1/222* (2013.01)

(58) Field of Classification Search
CPC ...... B64G 1/10; B64G 1/1078; B64G 1/1081; B64G 1/22; B64G 1/222; B64G 1/223; B64G 1/6462
See application file for complete search history.

(56) References Cited

U.S. PATENT DOCUMENTS

| | | | |
|---|---|---|---|
| 3,227,724 A | 1/1966 | Pfister et al. | |
| 5,156,361 A * | 10/1992 | Lang | B64G 1/646 244/159.4 |
| 5,196,857 A * | 3/1993 | Chiappetta | H01Q 1/08 244/172.6 |
| 6,899,009 B2 | 5/2005 | Christiansen et al. | |
| 8,403,269 B2 | 3/2013 | Stone et al. | |
| 9,617,017 B1 | 4/2017 | Kaplan | |
| 9,714,101 B1 | 7/2017 | Kaplan | |
| 11,724,833 B2 | 8/2023 | De Jong et al. | |
| 2011/0198446 A1 | 8/2011 | Knirsch et al. | |
| 2025/0206468 A1* | 6/2025 | Palisoc | B64G 1/22 |
| 2025/0236418 A1* | 7/2025 | LeGrand, III | B64G 1/10 |

OTHER PUBLICATIONS

Pulliam, Wade "Catcher's Mitt Final Report", Engineering, Environmental Science, Aug. 30, 2011, pp. 1-66.

* cited by examiner

*Primary Examiner* — Arfan Y. Sinaki
(74) *Attorney, Agent, or Firm* — CANTOR COLBURN LLP

(57) ABSTRACT

Space debris capture systems include an outer assembly and an inner assembly. The Outer assembly includes an outer membrane and an inner membrane, where, in a deployed state, the outer membrane is separated from the inner membrane by a separation gap. The inner assembly is arranged within the inner membrane of the outer assembly. The inner assembly is formed of a plurality of sheets of material arranged at a plurality of orientations relative to the inner membrane and define a plurality of cells within the outer assembly when in the deployed state. A first group of the cells are defined within surfaces of the plurality of sheets of material and a second group of cells are defined between the surfaces of the inner assembly and an inner surface of the inner membrane.

20 Claims, 11 Drawing Sheets

DEPLOYABLE SYSTEM FOR SPACE DEBRIS COLLECTION

BACKGROUND

The subject matter disclosed herein generally relates to space debris management and, more particularly, to systems and methods for space debris collection and management.

Objects that are in orbit around Earth or otherwise passing through space, near Earth or otherwise, as the result of space initiatives that no longer serve any function are called "space debris". Examples of space debris include expired spacecraft, upper stages of launch vehicles, debris released during spacecraft separation from its launch vehicle or during mission operations, debris created as a result of spacecraft or upper stage explosions or collisions, solid rocket motor effluents, paint flecks, thermal blankets, and the like. Most space debris is concentrated in what is considered Low Earth Orbit ("LEO") and geosynchronous orbit, most commonly used for various types of satellites. Space debris has been accumulating in LEOs between 600 km and 1200 km altitude since the beginning of human's presence and exploration of space. Current estimates are that there are more than 40,000 pieces of space debris larger than 10 cm orbiting Earth today, which are actively tracked, and more than 130,000,000 pieces smaller than 1 cm, which cannot be tracked and can strike a spacecraft without warning. Thus, the space debris density around Earth has reached a level of serious concern to active satellite operators, human space exploration, launch vehicles launching scientific and other missions from Earth, and other activities in space. In view of this, there is a need to either provide protection to spacecraft while in space and/or to provide mechanisms to capture and remove the space debris.

SUMMARY

According to some embodiments, space debris capture systems are provided. The space debris capture systems include an outer assembly having an outer membrane and an inner membrane, wherein, in a deployed state, the outer membrane is separated from the inner membrane by a separation gap, and an inner assembly arranged within the inner membrane of the outer assembly, the inner assembly formed of a plurality of sheets of material arranged at a plurality of orientations relative to the inner membrane and defining a plurality of cells within the outer assembly when in the deployed state, wherein a first group of the cells are defined within surfaces of the plurality of sheets of material and a second group of cells are defined between the surfaces of the inner assembly and an inner surface of the inner membrane.

In addition to one or more of the features described herein, or as an alternative, further embodiments of the space debris capture systems may include that the inner assembly includes at least one primary member and a plurality of secondary members, wherein the secondary members each comprise a planar sheet of material that extends, at least, between the at least one primary member and the inner membrane of the outer assembly, wherein each secondary member is arranged at an angle relative to a surface of the at least one primary member along a line of contact between the respective secondary member and the at least one primary member, wherein, in the deployed state, the at least one primary member is separated from the inner membrane by a standoff gap.

In addition to one or more of the features described herein, or as an alternative, further embodiments of the space debris capture systems may include that the outer assembly and the at least one primary member have a spherical shape.

In addition to one or more of the features described herein, or as an alternative, further embodiments of the space debris capture systems may include that the outer assembly and the at least one primary member have a cubic shape.

In addition to one or more of the features described herein, or as an alternative, further embodiments of the space debris capture systems may include that each secondary member is arranged orthogonal to a surface of the at least one primary member along a line of contact between the respective secondary member and the at least one primary member.

In addition to one or more of the features described herein, or as an alternative, further embodiments of the space debris capture systems may include that the inner assembly comprises a plurality of primary members arranged in a nested arrangement within the outer assembly, wherein each primary member has substantially the same shape as the outer assembly.

In addition to one or more of the features described herein, or as an alternative, further embodiments of the space debris capture systems may include that each primary member of the plurality of primary members is separated from an adjacent primary member by a standoff gap.

In addition to one or more of the features described herein, or as an alternative, further embodiments of the space debris capture systems may include a dispensing system configured to dispense material into the separation gap to apply an outward force and expand the outer assembly into the deployed state.

In addition to one or more of the features described herein, or as an alternative, further embodiments of the space debris capture systems may include that the dispensing system comprises a plurality of dispensers distributed about the outer assembly and arranged in fluid communication with the separation gap.

In addition to one or more of the features described herein, or as an alternative, further embodiments of the space debris capture systems may include that the dispensing system is configured to dispense a gas into the separation gap to apply the outward force to expand the outer assembly into the deployed state.

In addition to one or more of the features described herein, or as an alternative, further embodiments of the space debris capture systems may include that the outer membrane comprises a material that becomes strain-rigidized upon expansion to the deployed state.

In addition to one or more of the features described herein, or as an alternative, further embodiments of the space debris capture systems may include that the dispensing system is configured to dispense a foam into the separation gap to apply the outward force to expand the outer assembly into the deployed state.

In addition to one or more of the features described herein, or as an alternative, further embodiments of the space debris capture systems may include a control module arranged at a center of the inner assembly, the control module comprising at least one of control electronics and communications components.

In addition to one or more of the features described herein, or as an alternative, further embodiments of the space debris capture systems may include at least one thruster arranged on an outer surface of the outer assembly.

In addition to one or more of the features described herein, or as an alternative, further embodiments of the space debris capture systems may include that the at least one thruster is mounted on a respective thruster support.

In addition to one or more of the features described herein, or as an alternative, further embodiments of the space debris capture systems may include that the thruster support is a telescoping element configured to extend during expansion to the deployed state.

In addition to one or more of the features described herein, or as an alternative, further embodiments of the space debris capture systems may include a space asset, wherein the outer assembly is attached to the space asset.

In addition to one or more of the features described herein, or as an alternative, further embodiments of the space debris capture systems may include at least one solar panel arranged on an exterior surface of the outer membrane.

In addition to one or more of the features described herein, or as an alternative, further embodiments of the space debris capture systems may include at least one antenna arranged on an exterior surface of the outer membrane.

In addition to one or more of the features described herein, or as an alternative, further embodiments of the space debris capture systems may include that a supply container housing a supply of material to be used to deploy the outer assembly from a stowed state to the deployed state.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE SEVERAL VIEWS OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
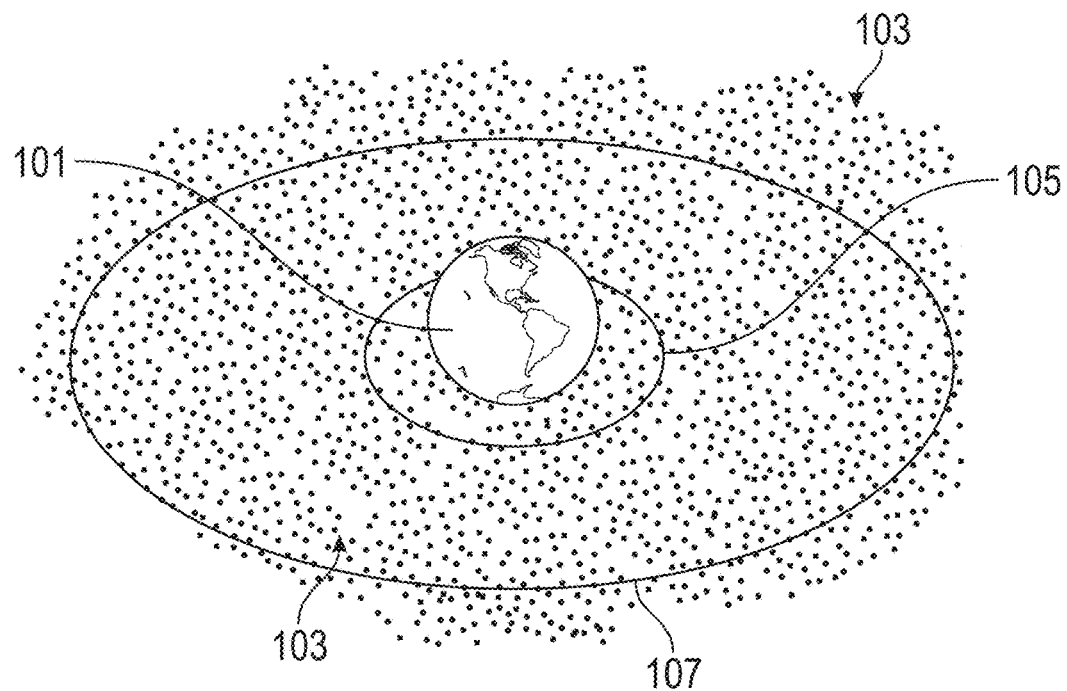
FIG. 1 is a schematic illustration of space debris distributed about the Earth.
Figure 2:
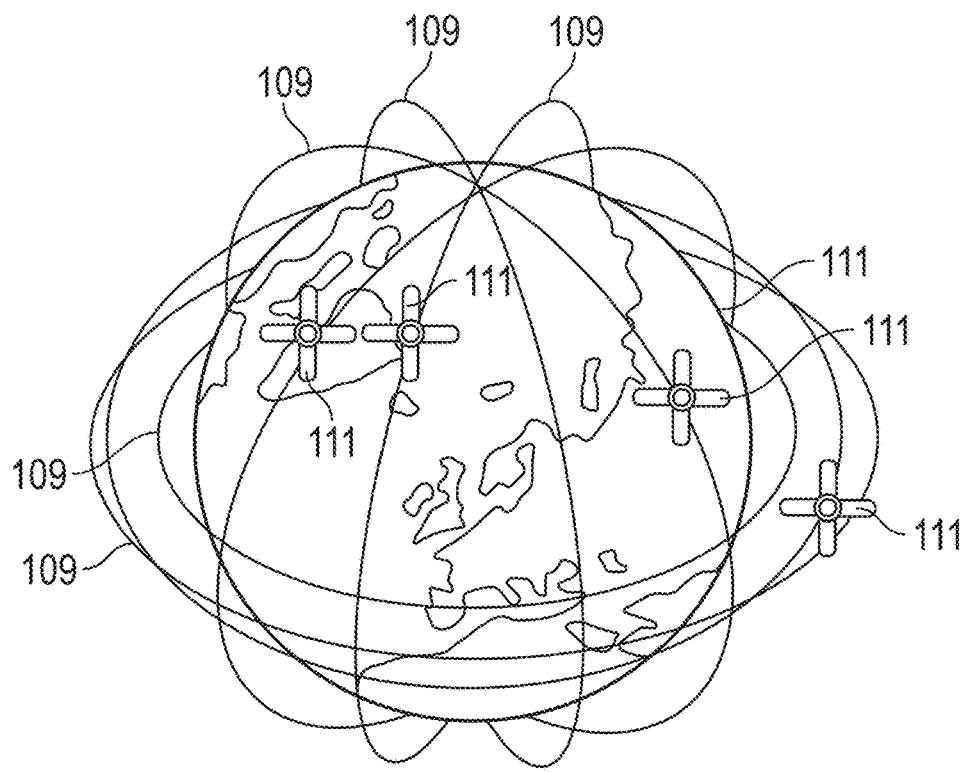
FIG. 2 is a schematic illustration of orbits of space assets about Earth.

FIG. 1 is a depiction of the Earth 101 with the instantaneous positioning of space debris objects 103 from near-Earth, such as around Low Earth Orbit (LEO) 105 to beyond geostationary Earth orbit ("GEO") 107 located at approximately 35,800 km above the Earth. Although LEO 105 is illustrated as a single orbit, it will be appreciated that low Earth orbit refers to a wide band or span of altitudes and may be defined as orbits of 2,000 km in altitude and less. It will be appreciated that space debris may be located at any altitude, and relative to any latitude and/or longitude about the Earth 101. Although millions of space debris objects 103 surround the Earth 101, specific altitudes may be of particular concern due to the high use of such altitudes (e.g., LEO 105). Many pieces of space debris that threaten the safety of active scientific, commercial, and military satellites in Earth's orbit are resident in LEO 105 and/or pass through LEO 105. FIG. 2 illustrates several space assets 111 (e.g., satellites, stations, manned craft, etc.) in orbits 109 (although more orbits 109 are shown than space assets 111). The orbits 109 of the space assets 111 may be in LEO 105, and thus may be at risk of collisions with the space debris objects 103, shown in FIG. 1.

In view of the risk to space assets, such as satellites, manned spacecraft, scientific devices, systems, and craft, and the like, methods and mechanisms for capturing and/or removing space debris may be helpful for protecting such space assets. In view of this, embodiments of the present disclosure are directed to deployable systems for protecting space assets from small space debris and/or space debris fragments. In accordance with some embodiments, the deployable systems may be arranged to provide three-dimensional shielding. Conventional shielding systems are arranged in two-dimensional configurations, using, typically, two parallel layers or sheets, with surfaces of constant vertical dimension (e.g., Whipple Shield). A Whipple Shield operates using two spaced apart layers. An incoming space debris object will impact on a first or outer layer and shatter or break into multiple smaller pieces. The impact with first or outer layer will operate to absorb some momentum of the space debris object to thereby slow it down some. These smaller pieces will then travel across the gap between the layers (or through additional layers or material) and then impact upon a second or inner layer in a distributed manner due to the energy/momentum being broken up by the first/ outer layer. Although such Whipple Shields are generally effective, there are drawbacks to such systems. In view of this, and other considerations, embodiments of the present disclosure include additional layers arranged to form a three-dimensional shielding structure.

In accordance with embodiments of the present disclosure, the additional layers may be arranged or oriented at an angle (e.g., orthogonal) relative to the other layers of the system. For example, a primary outer layer assembly may include an outer layer, a gap, and an inner layer, and may form a generally hollow, spherical shape, although other geometries such as cubes, cones, polyhedrons, cylinders, ellipsoids, ovoid, capsule, and the like may be employed without departing from the scope of the present disclosure. Arranged inward from the inner layer of the outer layer assembly may be additional layers or structures that are arranged parallel with the outer layer assembly, such as having the same geometric shape, but smaller and nested within the outer layer assembly. Furthermore, additional layers or structures may be arranged at angles relative to the outer layer assembly, such as sheets or layers arranged normal to the surface of the shape of the outer layer assembly. In accordance with some embodiments, such additional layers may provide additional shielding and may also lessen a dependence upon an angle of incidence of an impact from a piece of space debris.

The three-dimensional space debris capture systems, described herein, may be configured to be launched in a compact state and then deployed, in space, to capture space debris, clear a path of a spacecraft of space debris, or otherwise may be deployed as will be appreciated by those of skill in the art in view of the teachings herein. In some embodiments, the space debris system is folded or packaged in a stowed state to minimize volume, such as for launch from Earth. The space debris capture systems may be deployed into an operational state by operation of gas, foam, mechanical mechanisms, or the like, and/or combinations thereof. In some configurations, the space debris capture systems may be standalone or independent assemblies that separate from other craft. In other configurations, the space debris capture systems described herein may be attached to and/or an integral system or component of a spacecraft. In some such configurations, the space debris capture systems may be positioned on the spacecraft to protect sensitive parts, to protect the entire spacecraft, or may be otherwise arranged on the associated spacecraft. In still further embodiments, a space debris capture system may be deployed from a spacecraft to travel in front of the spacecraft, while not being directly coupled to the spacecraft.

In accordance with some embodiments of the present disclosure, the space debris capture systems may include control mechanisms, including thrusters, reaction wheels, stabilizers, gyroscopes, control electronics, communications components, power sources, and the like. In the case of power sources, stored power in the form of batteries, capacitors, or the like. In other configurations, or in combination therewith, power generation, such as solar panels or arrays may be configured to provide power to various electrical components.

Figure 3A:
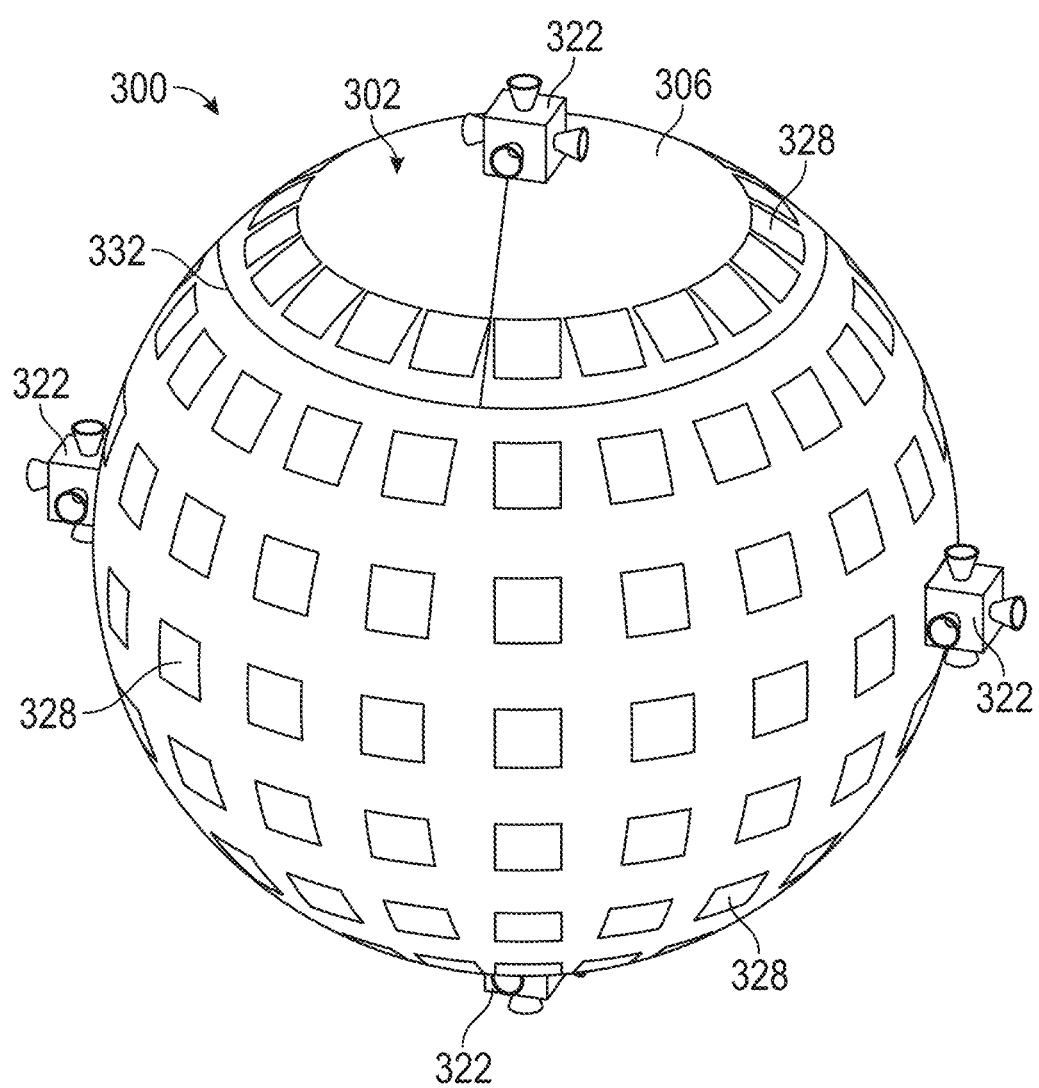
FIG. 3A is a schematic illustration of a space debris capture system in accordance with an embodiment of the present disclosure.
Figure 3B:
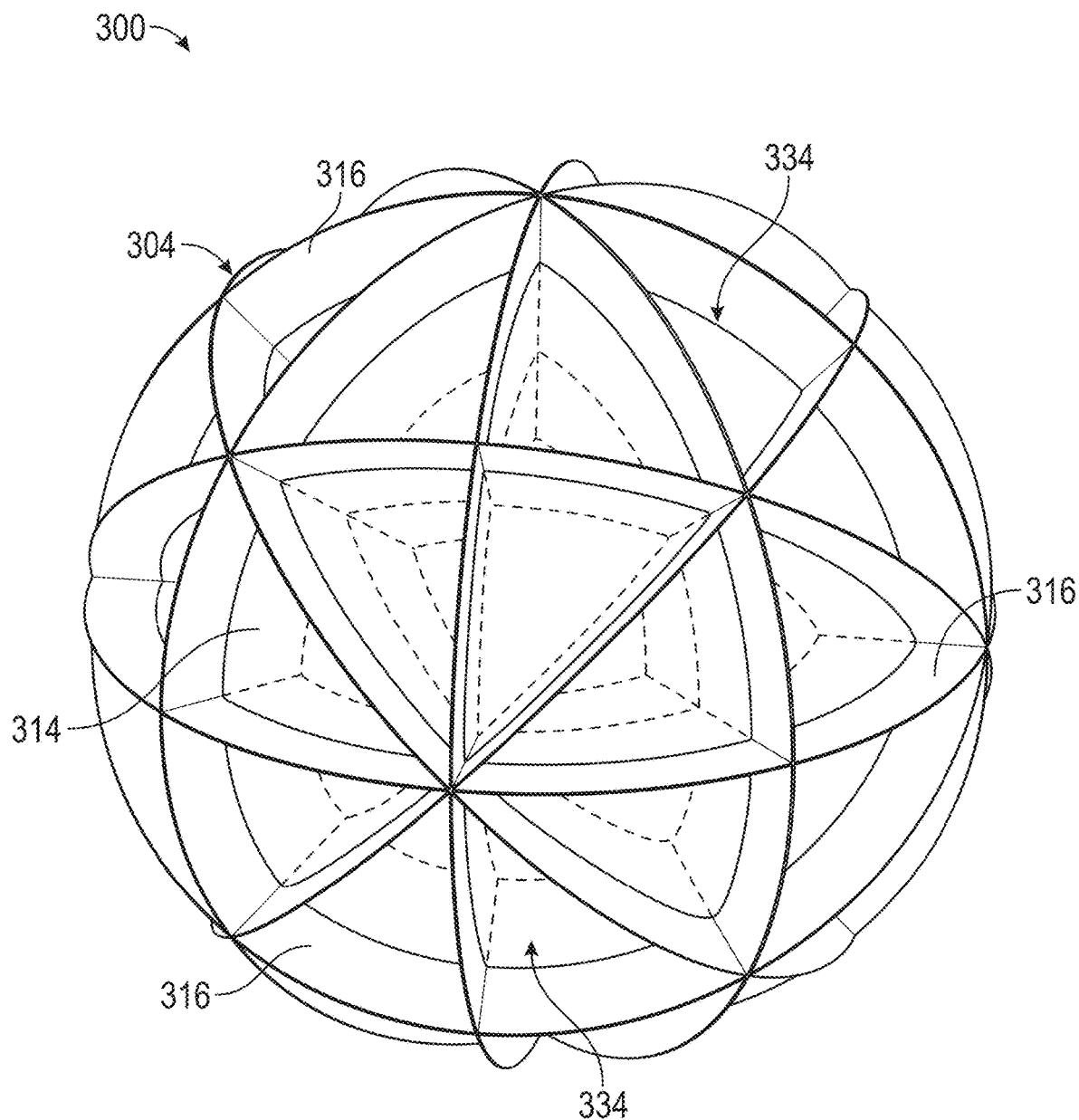
FIG. 3B is a schematic illustration of the space debris capture system of FIG. 3A, illustrating an inner assembly thereof.
Figure 3C:
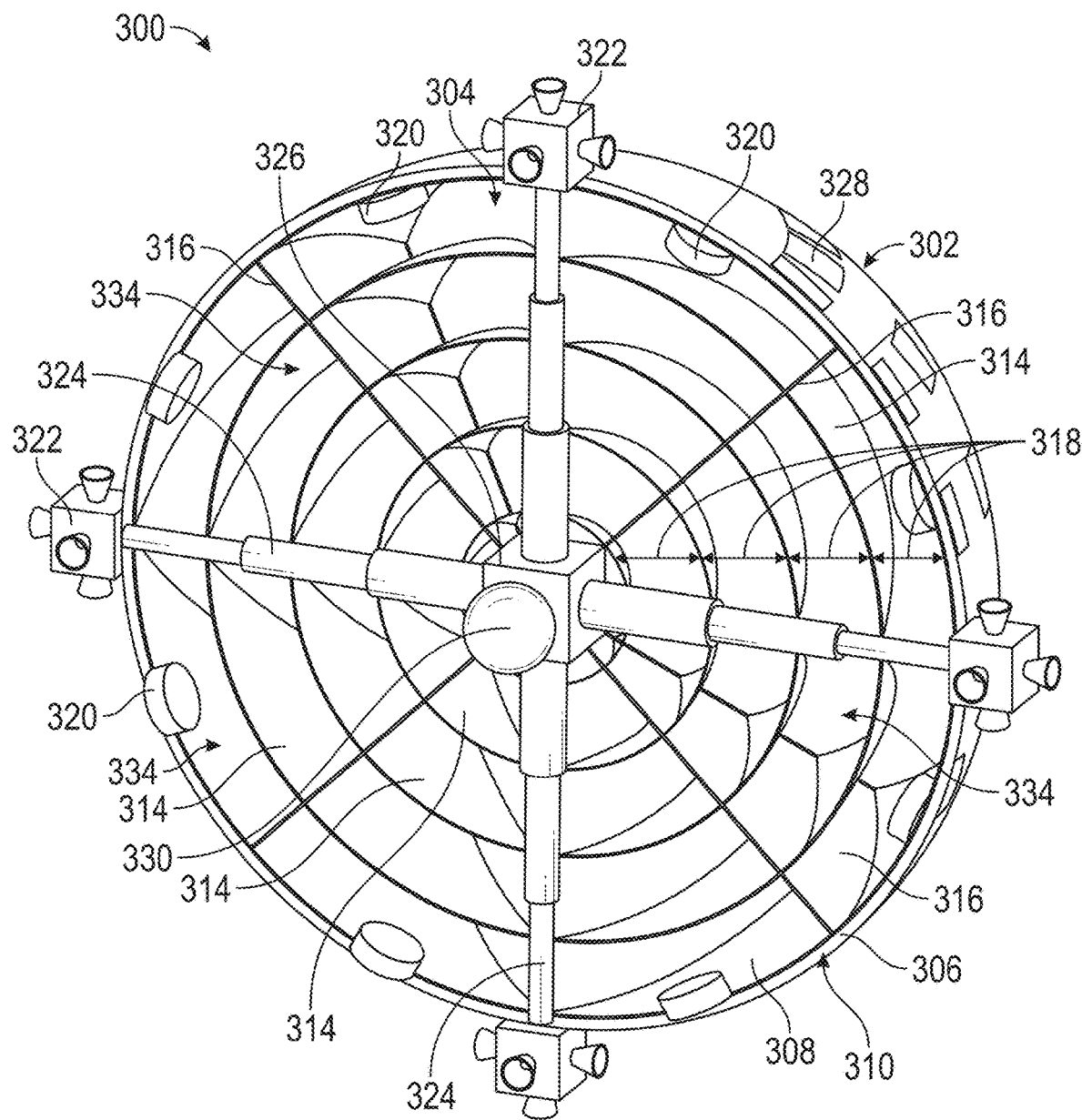
FIG. 3C is a cross-sectional illustration of the space debris capture system of FIG. 3A.
Figure 3D:
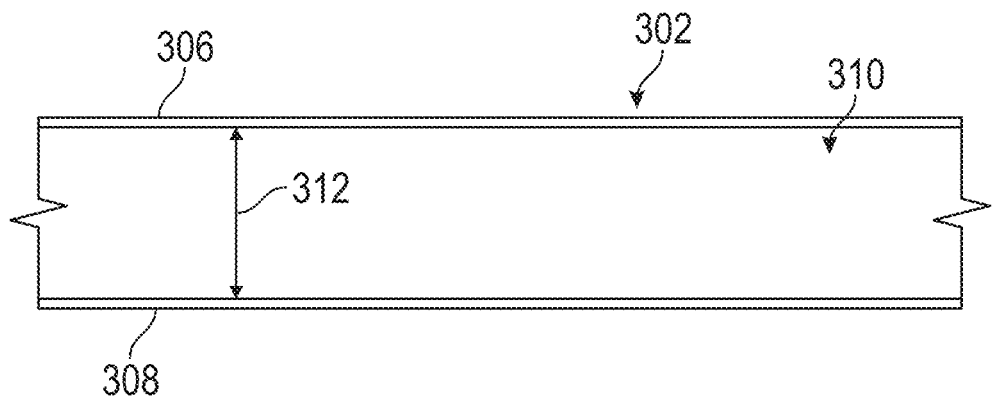
FIG. 3D is an enlarged detail of a portion of an outer assembly of the space debris capture system of FIG. 3A.
Figure 3E:
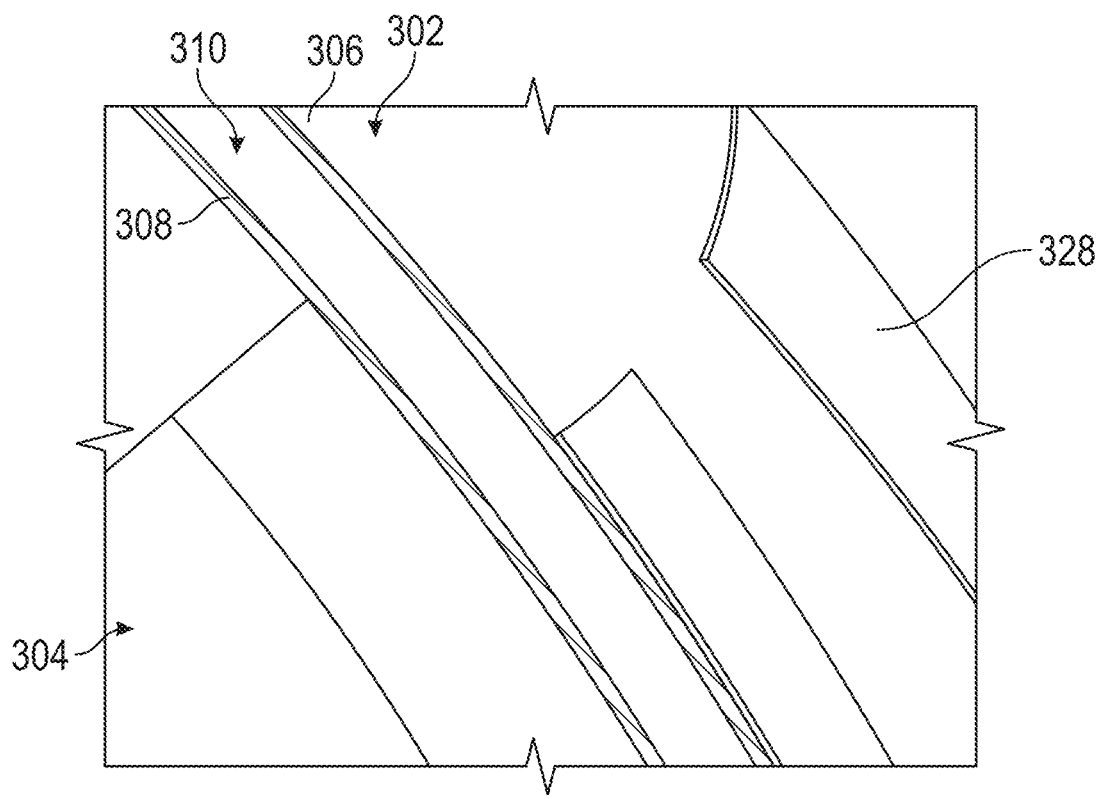
FIG. 3E is another enlarged detail of the outer assembly of the space debris capture system of FIG. 3A.
Figure 3F:
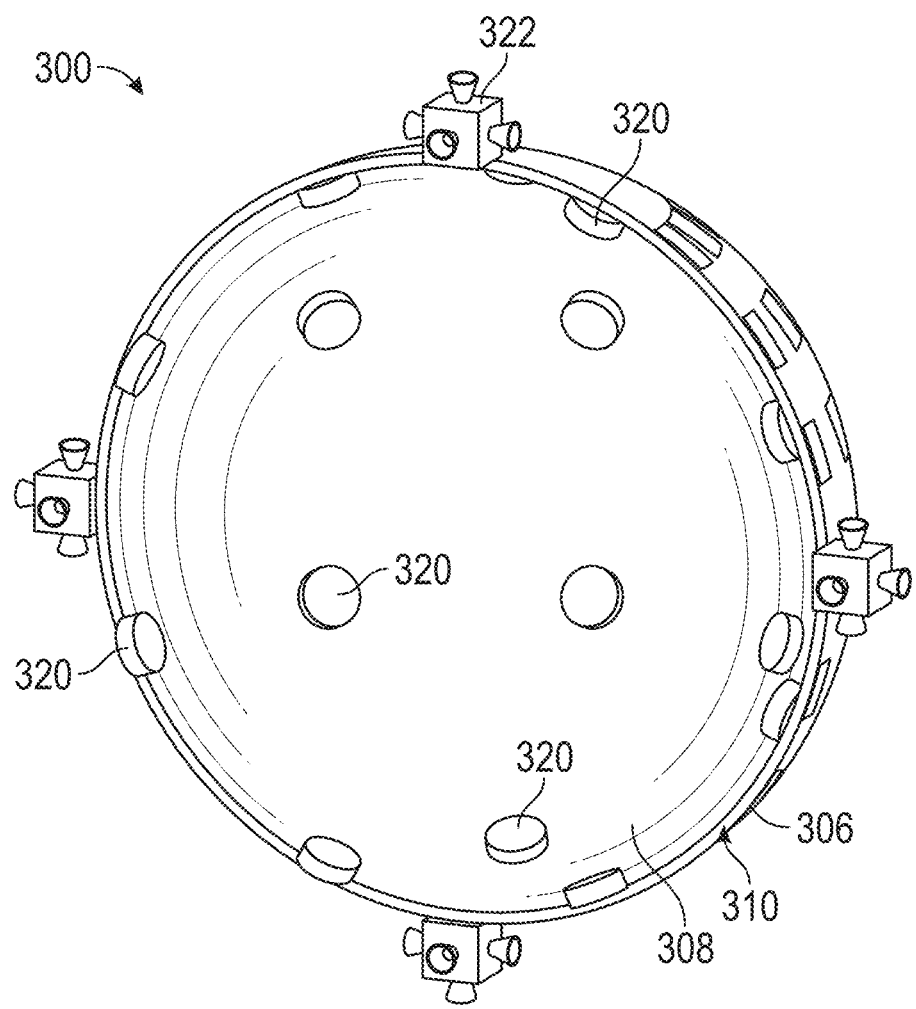
FIG. 3F is a schematic illustration of the outer assembly of the space debris capture system of FIG. 3A shown in cross-section and without the inner assembly shown.

Referring now to FIGS. 3A-3F, schematic illustrations of a space debris capture system 300 in accordance with an embodiment of the present disclosure are shown. The space debris capture system 300 in this illustrative configuration is a spherical structure, although, as noted above, other geometric shapes may be used without departing from the scope of the present disclosure. The space debris capture system 300 includes an outer assembly 302, shown in FIGS. 3A, 3C-3E, and an inner assembly 304, shown in FIGS. 3B-3C, 3D. FIG. 3B illustrates the inner assembly 304 with the outer assembly 302 removed therefrom for clarity and illustration of the inner assembly 304. FIG. 3C illustrates a cross-sectional view of the space debris capture system 300. FIGS. 3D-3E illustrate enlarged detail of the outer assembly 302. FIG. 3F illustrates the interior structure of the outer assembly 302 with the inner assembly 304 removed for purposes of illustration.

In FIGS. 3A-3E, the space debris capture system 300 is shown in a deployed state. The outer assembly 302 of the space debris capture system 300 is formed of a multi-layer assembly, as shown in more detail in FIGS. 3D-3E. The outer assembly 302 is formed of an outer membrane 306 that is separated from an inner membrane 308 by a separation gap 310 having a gap distance 312, shown in FIG. 3D. In accordance with some non-limiting embodiments, the outer membrane 306 may be a permeable membrane configured to receive direct impacts from space debris. The outer membrane 306 may be formed from various materials, including, but not limited to, woven ceramic fabric (e.g., alumina-boria-silica fibers). The inner membrane 308 may be formed from the same or different material than that of the outer membrane 306. In some embodiments, the inner membrane 308 may be formed from aramid fiber fabrics, or the like. In accordance with some embodiments, the separation gap 310 between the outer membrane 306 and the inner membrane 308 may be filled with gas (e.g., nitrogen, etc.) or a foam material (e.g., expanding foam material, self-curing foam material, etc.). In the case of a gas, the gas may permeate through the outer member 306, but the outer assembly 302 will retain its rigidity, structure, and shape because it will be strain-rigidized. This may be achieved due to the material selection for the outer assembly 302, such as aluminum. In the case of an expandable and curing foam, the foam may provide the rigidity alone and/or in combination with a strain-rigidized outer assembly 302.

The arrangement of the outer assembly 302 may be configured with two parallel sheets or layers of material with a space or gap therebetween. The space or gap between the layers of the outer assembly 302 may be filled with a gas or foam, as described herein, during deployment of the system. In some configurations of the present disclosure, the parallel sheets or layers are spherical in geometry, with the outer membrane 306 and the inner membrane 308 being arranged as concentric spheres. In some embodiments, the membranes 306, 308 may be arranged as concentric ballistic-resistant spherical shells, for example. It will be appreciated that other material configurations may be employed without departing from the scope of the present disclosure. For example, the use of ceramic fabrics and/or aramid-fiber based fabrics may be employed for both layers of the outer assembly 302, or combinations thereof, for one or both of the layers/sheets.

In accordance with a non-limiting embodiment, the outer membrane 306 may be formed from a material selected to be sacrificial, that is configured to shock or otherwise break up an incoming projectile (e.g., space debris), breaking it into a cloud containing material of the projectile and, potentially, material of the outer membrane 306. The debris cloud produced by the impact with the outer membrane 306 will expand in area/volume as it travels across the separation gap 310, thus spreading and distributing the energy and momentum of the projectile over a greater area at the inner membrane 308. The projectiles may be captured by the inner membrane 308 or may pass therethrough, into an interior of the space debris capture system 300. In some configurations, the separation gap 310 may be filled with a foam, which can further absorb energy/momentum of the projectiles and/or capture the space debris. It will be appreciated that the size of the separation 310 may result in different amounts of expansion of the debris cloud, with a smaller gap resulting in a smaller amount of expansion of the particle debris cloud before the particle debris cloud interacts with the inner membrane 308.

In the deployed state, as shown in FIGS. 3A-3C and noted above, the space debris capture system 300 includes an inner assembly 304, which is arranged radially inward from an inner surface of the inner membrane 308 of the outer assembly 302. The inner assembly 304 is shown in more detail (without the outer assembly 302) in FIG. 3B, and in cross-section in FIG. 3C. The inner assembly 304 is formed from a set of primary members 314 and a set of secondary members 316. The primary members 314 are arranged to be parallel with the outer assembly 302. Accordingly, in this illustrative configuration, the primary members 314 are a set of spherical bodies, with each primary member 314 being a sheet or layer of material that is nested within the outer assembly 302. Each primary member 314 is separated, in a radial direction in this spherical configuration, by a standoff gap 318. The primary members 314, in this configuration, may be a ballistic-resistant spherical shell, arranged concentrically or nested, to form a series of parallel layers of material (in a radial direction). Each of the standoff gaps 318 between the primary members 314 provides a span of distance (in the radial direction) for particles and/or debris to traverse, as it penetrates into and through the layers and material of the space debris capture system 300, similar to the separation gap 310 provided between the membranes 306, 308 of the outer assembly 302. The standoff gaps 318 may be set based on the overall size of the space debris capture system 300. For example, the standoff gaps 318, in some non-limiting examples, may be set to be a ratio or percentage of the total size of the space debris capture system. For example, and without limitation, a 1 meter outer diameter shield may have standoff gaps of 10 cm between layers, or a 2 meter outer diameter shield may have standoff gaps of 20 cm between layers (using the same number of layers as the 1 meter shield). That is, the separation gap may be about 10% the outer diameter or largest dimension of the space debris capture system. It will be appreciated that larger or smaller standoff gaps may be employed without departing from the scope of the present disclosure. Such relatively large standoff gaps 318 can achieve a large distribution of particle fragments from one layer (e.g., inner membrane 308 or radially outward primary member 314) to be distributed over a large area before impacting the next layer (e.g., radially inward primary member 314), thus reducing the areal density of the incident kinetic energy and increasing the ability of the next layer to stop or slow the individual fragments.

The inner assembly 304 also includes the secondary members 316. The secondary members 316 may be formed as planar sheets or layers of material that are arranged orthogonally or at an angle to the primary members 314. The angle of orientation of the secondary members 316 relative to the primary members 314 is along a line of contact between the respective primary and secondary members 314, 316. The secondary members 316 are arranged to span the standoff gap 318, and thereby define cells or voids within the interior of the space debris capture system 300. The secondary members 316 may be ballistic-resistant barriers, formed as sheets or planar members. In this configuration, the secondary members 316 are planar sheets that are oriented through a center of the space debris capture system 300, and have generally circular, planar shapes arranged within the spherical shape of the space debris capture system 300. That is, in some embodiments, each secondary member 316 will pass through a center of the geometric shape of the space debris capture system 300. In such a configuration, the interior of the space debris capture system 300 is formed of a grid-like structure of hollow spaces defined by surfaces of the primary members 314 and the secondary members 316, and at an outer-most level, between the outer-most primary member 314, the secondary members 316, and an inner surface of the inner membrane 308 of the outer assembly 302. In other configurations, the secondary members 316 may be arranged offset from a center point/axis of the space debris capture system 300, without departing from the scope of the present disclosure.

At each intersection between the primary members 314 and the secondary members 316, the material of the members 314, 316 may be bonded or otherwise attached together (e.g., sewn, glued, stapled, fastened, etc.) or the entire assembly may be manufactured as a continuous or single structure, such as by additive manufacturing or other means for assembly complex fabric configurations, as will be appreciated by those of skill in the art. In accordance with some embodiments of the present disclosure, the primary members 314 may be arranged to have a geometry and shape similar to the outer assembly 302. In this case, for example, each of the primary members 314 is a spherical shape that is nested within or arranged within the outer assembly 302. The secondary members 316 provide connections between the outer-most primary member 314 and the inside of the outer assembly 302, and between concentrically adjacent elements of the primary members 314.

The inclusion of the secondary members 316 allows for improved space debris capture. For example, by including sheets of material that are orthogonal or otherwise angled relative to the primary members, an angle of incidence of a projectile or space debris is reduced as a factor on effectiveness. That is, because the various sheets create a grid-like internal structure, the angle of incidence of a projectile is not as important, because any angle of incidence will result in a projectile passing through and interacting with multiple layers of different orientations. As such, even a low angle of incidence that may result in a projectile not passing through from the outer assembly 302 to the first parallel layer of the primary members 314 will still result in the projectile contacting at least one of the secondary members 316.

The secondary members 316 may also provide for structural support within the space debris capture system 300. That is, the secondary members 316 can provide support for the various layers of the primary members 314, thus increasing the performance and durability of the space debris capture system 300.

To deploy the space debris capture system 300 from a stowed state, where the material of the inner and outer assemblies 302, 304 are folded and packaged into a small volume (e.g., for transport), the space debris capture system 300 includes a deployment mechanism. The deployment mechanism can take various forms including the use of an expandable material, such as a gas or a foam, and/or mechanical means, such as telescoping arms. As shown in FIG. 3C, the space debris capture system 300 includes a set of dispensers 320. The dispensers 320 are distributed about an interior surface of the outer assembly 302. The dispensers 320 are fluidly connected to the separation gap 310 and arranged to dispense a material into the separation gap 310. For example, in some configurations, the dispensers 320 may be foam dispensers arranged to inject an expandable foam material into the separation gap 310. As the foam fills and expands within the separation gap 310, the outer assembly 302 will expand outward, pulling on the material of the inner assembly 304 and deploying the inner assembly 304 to form the cell-like structure of the of the deployed and assembled space debris capture system 300.

As illustrated in FIGS. 3C, 3F, the dispensers 320 are distributed about the interior surface of the outer assembly 302. It will be appreciated that the dispensers 320 may be distributed evenly about the interior surface of the outer assembly 302, such as shown in FIG. 3F. Each dispenser 320 may include a dedicated or discrete supply of material for dispensing into the separation gap 310. Such a distributed dispensing system can eliminate the need for a centralized storage configuration and/or multiple dispensing hoses or conduits. Furthermore, using such a distributed dispensing system will minimize the distance between the dispenser 320 and the volume to be filled to thereby improve uniformity of the dispensed material. The dispensers 320 may be filled with a supply of a gas, such as nitrogen, for dispensing into the separation gap 310. In other embodiments, the dispensers 320 may be configured to dispense an expandable foam. In either case, as the dispensed material fills the separation gap 310, the outer assembly 302 will expand due to application of a net outward force (e.g., radial for a spherical structure) to the interior surface of the outer membrane 306. In some configurations, a combination of both a foam and a gas may be used. In the case of a foam material, once fully expanded, the separation gap 310 will be filled with the foam, thus providing additional absorption capabilities for managing and capturing space debris. In other configurations, the outer membrane 306 may be formed from two materials, such as aluminum bonded to a thin sheet of polyester film (e.g., biaxially-oriented polyethylene terephthalate), and inflated or expanded using a gas. For example, the dispensers 320 may dispense a gas such as nitrogen into the separation gap 310, and the aluminum will become strain-rigidized upon full inflation so that the spherical structure will retain and maintain its shape without constant internal pressure.

The space debris capture system 300 is intended for use in space and is configured to be intentionally impacted by space debris. As such, during use, the position of the space debris capture system 300 may be changed. That is, for example, an impact from space debris may cause the space debris capture system 300 to change the orbit of the space debris capture system 300 or relative position with respect to a spacecraft that is to be protected by the space debris capture system 300. In some operations, the insertion of the space debris capture system 300 into an intended orbit or altitude may require onboard maneuvering assistance. Accordingly, as shown, the space debris capture system 300 may include a maneuvering system, which may include one or more optional thrusters 322. The thrusters 322 may be mounted on optional respective thruster supports 324, such as telescoping rods or frame elements.

The thruster supports 324 may be extendable from a control module 326, which may include a housing, electronic components (e.g., control, processing, communication, etc.), batteries, and the like. In some configurations, wiring, conduits, tubing, or the like may be arranged within the thruster supports 324 to provide command, control, power, and communication therethrough, from the control module 326 to the thrusters 322. In some configurations, and as shown, electrical power may be generated and provided by one or more solar panels 328. Power generated at the solar panels 328 may be conveyed to the control module 326 through printed circuits on the material of the layers and membranes of the space debris capture system 300 and/or through or along the thruster supports 324. The control module 326 may be configured to control operation of the dispensers 320 and/or the thrusters 322. The control module 326 may be in wired connection or wirelessly connected to the dispensers 320 and/or the thrusters 322 and/or control elements thereof. The control module 326 may include gyroscopes, wheels, and the like to restore attitude following impacts from space debris.

Arranged at the core or center of the space debris capture system 300, with the control module 326, may be an optional supply container 330. The supply container 330 may be filled with pressurized gas that can be used for deploying the space debris capture system 300. The supply container 330 may be controlled by components of the control module 326.

The control module 326 may be configured to control positioning, movement, rotation, and the like for operation of the space debris capture system 300. For example, the control module 326 may include control electronics for operating the thrusters 322 to allow for positioning, rotation, and adjustments in response to impacts from space debris. The adjustments may also be used to achieve orientation for communications, such as for antenna pointing. For example, as shown in FIG. 3A, the space debris capture system 300 may include optional printed antennas 332 on the exterior surface of the outer membrane 306 of the outer assembly 302. The antennas 332 may be connected to the control module 326 through electrical connections that are arranged within or through the thruster supports 324, or using other paths, such as along a surface of one of the secondary members 316.

As noted above, the arrangement of the primary and secondary members 314, 316 may be configured to define cells or voids within the interior of the space debris capture system 300. For example, as shown in FIGS. 3B-3C, the arrangement of the primary members 314 and the secondary members 316 will define cells 334 between surfaces of the primary and secondary members 314, 316. At the outer-most layer of the primary member 314, the cells 334 are defined between the radially outer surface of the primary member 314, the radially inner surface of the inner membrane 308 of the outer assembly 302, and between surfaces of secondary members 316. Each cell 334 may be a three-dimensional slice or portion of a spherical shape, having curved surfaces defined by surfaces of the primary members 314 (and the inner membrane 308), and straight walls defined by surfaces of the secondary members 316. Although shown in FIGS. 3A-3F with the space debris capture system 300 having a spherical geometry, such is not intended to be limiting.

Figure 4A:
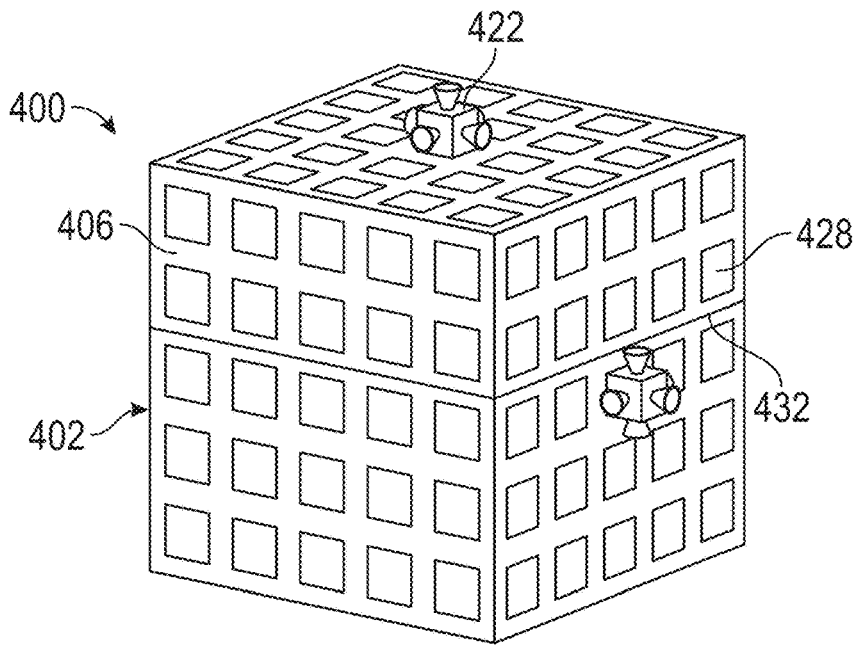
FIG. 4A is a schematic illustration of another configuration of a space debris capture system in accordance with an embodiment of the present disclosure.
Figure 4B:
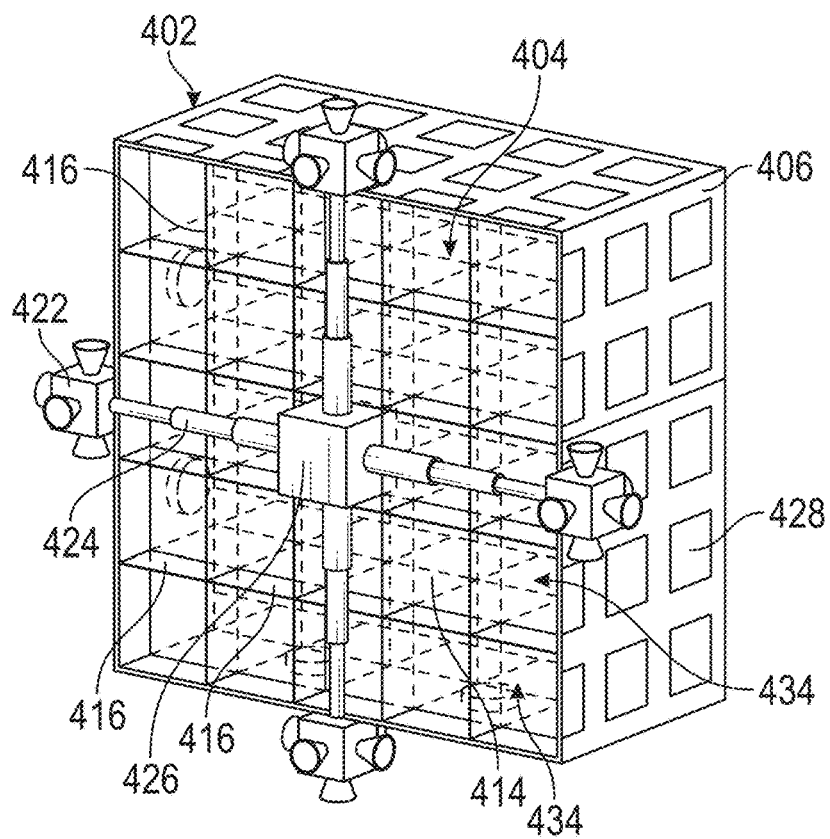
FIG. 4B is a schematic illustration of the space debris capture system of FIG. 4A, illustrating a cross-sectional view thereof.
Figure 4C:
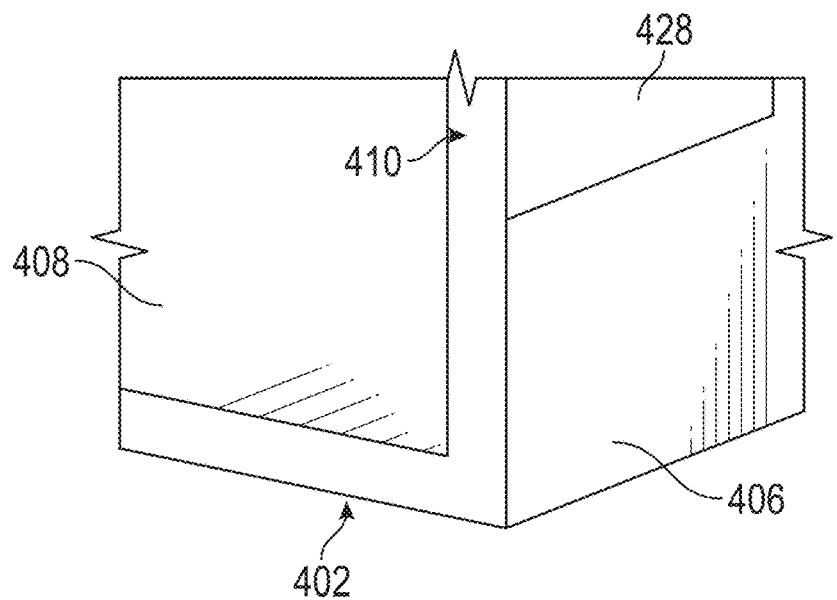
FIG. 4C is an enlarged detail of a portion of an outer assembly of the space debris capture system of FIG. 4A.
Figure 4D:
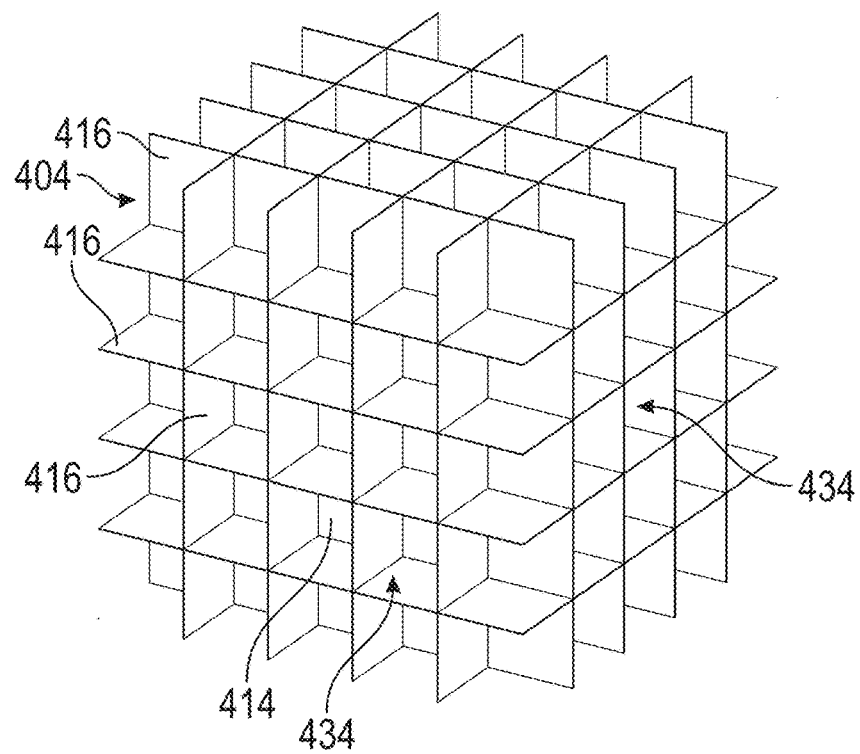
FIG. 4D is a schematic illustration of the space debris capture system of FIG. 4A, illustrating an inner assembly thereof.
Figure 4E:
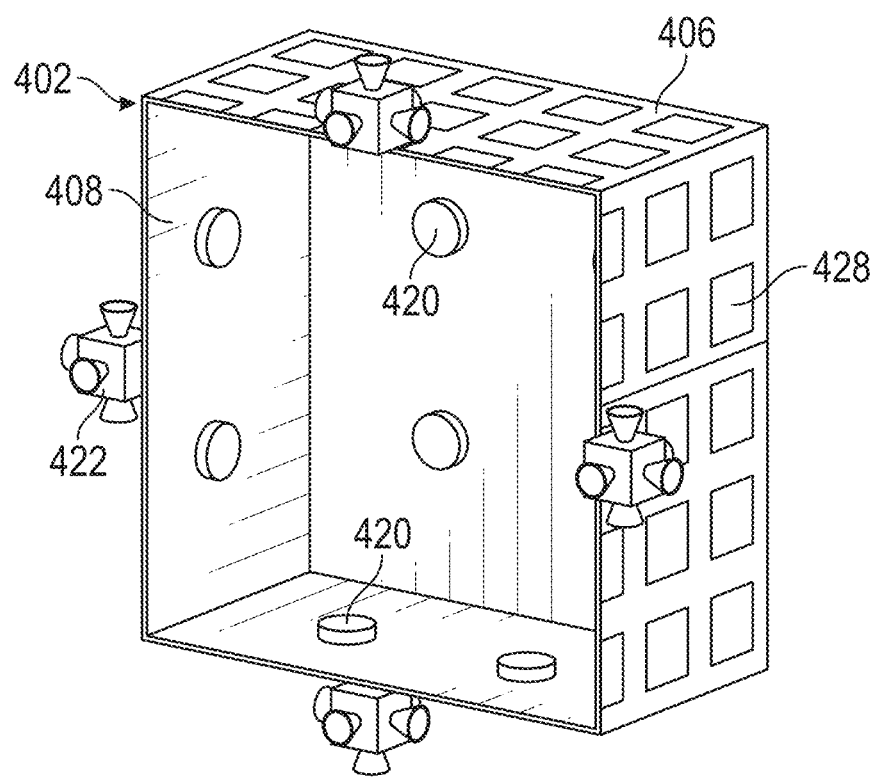
FIG. 4E is a schematic illustration of the outer assembly of the space debris capture system of FIG. 4A shown in cross-section and without the inner assembly shown.

For example, referring now to FIGS. 4A-4E, schematic illustrations of a space debris capture system 400 having a cubic shape in accordance with an embodiment of the present disclosure are shown. FIG. 4A illustrates the space debris capture system 400 in a deployed state and having a cubic geometry. FIG. 4B illustrates a cross-sectional view of the interior structure of the space debris capture system 400, with the space debris capture system 400 having an outer assembly 402 and an inner assembly 404. FIG. 4C illustrates an enlarged detail of a portion of the outer assembly 402. FIG. 4D illustrates the structure of the inner assembly 404 in isolation and FIG. 4E illustrates the outer assembly 402 with the inner assembly 404 removed to illustrate features of the interior of the outer assembly 402. The space debris capture system 400 is similar to the space debris capture system 300 shown and described above, but has the cubic geometry rather than the previously described spherical geometry.

As shown in FIGS. 4A-4E, the space debris capture system 400 includes similar features as that shown and described above, and thus detailed description thereof will not be repeated. For example, the outer assembly 404, as shown in FIG. 4C, is formed of an outer membrane 406 and an inner membrane 408 with a separation gap 410 defined therebetween. The separation gap 410 may be filled with gas, foam, or a combination thereof, during deployment. The materials of the outer assembly 404 may be selected for maintaining shape once deployed, such as by use of a foam and/or strain-rigidized materials, as described above. The exterior surface of the outer assembly 404 may be provided with solar panels 428, printed antenna 432, and thrusters 422. The thrusters 422 may be supported on thruster supports 424 which may be extendable from a control module 426, similar to that shown and described above. The outer assembly 404 may be deployed or expanded from a stowed state to the deployed state via injection or dispensing of gas and/or foam into the separation gap 410 from one or more dispensers 420.

FIGS. 4B, 4D illustrate the structure of the inner assembly 404. Similar to the above-described configuration, the inner assembly 404 is formed of a set of primary members 414 and a set of secondary members 416. The primary members 414 of the inner assembly 404 are geometrically shaped similar to the outer assembly 402 of the space debris capture system 400. That is, in this illustrative configuration, the outer assembly 402 is a cubic shape, and each primary member 414 of the inner assembly 404 is similarly a cubic shape. The secondary members 416 are arranged as planar sheets that intersect the surfaces of the primary members at normal or orthogonal angles, creating a set of cells 434 within the interior of the space debris capture system 400. Accordingly, the cubic configuration of the space debris capture system 400, shown in FIGS. 4A-4E, can provide a three-dimensional space debris capture system, with layers, surfaces, and members of the space debris capture system 400 providing regions to allow for space debris impact and capture and any angle of incidence. The space debris may be broken up into smaller pieces as it impacts and passes through the outer assembly 402, which may include an outer membrane 406, a foam arranged within the separation gap 410, and an inner membrane 408. If the particles of the debris continue through the inner membrane 408, the inner assembly 404 provides for additional material and surfaces to absorb the energy and momentum of the particles, to thereby capture the space debris.

Although described with respect to concentric primary members 414 and joining or bridging secondary members 416, the space debris capture systems may be described using alternative language which may result in the same end structure, or a similar structure. For example, and without limitation, a rectangular geometry configuration of a space debris capture system in accordance with the present disclosure may be formed with a set of layered/parallel sheets of material where each layer is parallel to one of the coordinate planes (i.e., the XY, XZ, and YZ planes). The eggcrate-like structure illustrated in FIG. 4D may be described as three sets of layers, one parallel to XY, one parallel to XZ, and one parallel to YZ. It will be appreciated that similar arrangements of sheets or layers of material may be similarly oriented within a spherical shell, without departing from the scope of the present disclosure. For example, the eggcrate structure shown in FIG. 4D may be incorporated into an outer shell structure similar to that shown in FIG. 3F.

As noted above, the space debris capture systems may be stand-alone systems that can be deployed into an orbit to clear or collect space debris, or may be deployed to operate in tandem with a spacecraft to be protected from space debris. In such configurations, the space debris capture systems include onboard controller elements, reaction wheels, stabilizers, gyroscopes, control electronics, communications components, power sources, and the like. The space debris capture systems of the present disclosure include outer assemblies formed of a two-layer configuration with a separation gap therebetween, which may be filled with gas and/or foam, which may be expanding/self-curing. An inner assembly is arranged within the outer assembly and arranged to define a number of internal cells that are defined between surfaces of primary and secondary members of the inner assembly. Although shown above with the secondary members being arranged at normal/orthogonal angles relative to the primary members, such orientations are not to be limiting, and the secondary members may be arranged at any angle relative to surfaces of the primary members and/or the outer assembly.

The independent or stand-alone systems are not intended to be limiting. For example, in some configurations, the space debris capture systems may be made as an integral or onboard system of a spacecraft, such as a satellite. In such configurations, the space debris capture systems may be deployed in front of or around the spacecraft in desired locations to provide protection to sensitive components or modules (e.g., occupied habitats or the like). Such onboard space debris capture systems may be attached to the respective spacecraft and thus may not necessarily require all of the control components of the standalone systems, shown and described above.

Figure 5A:
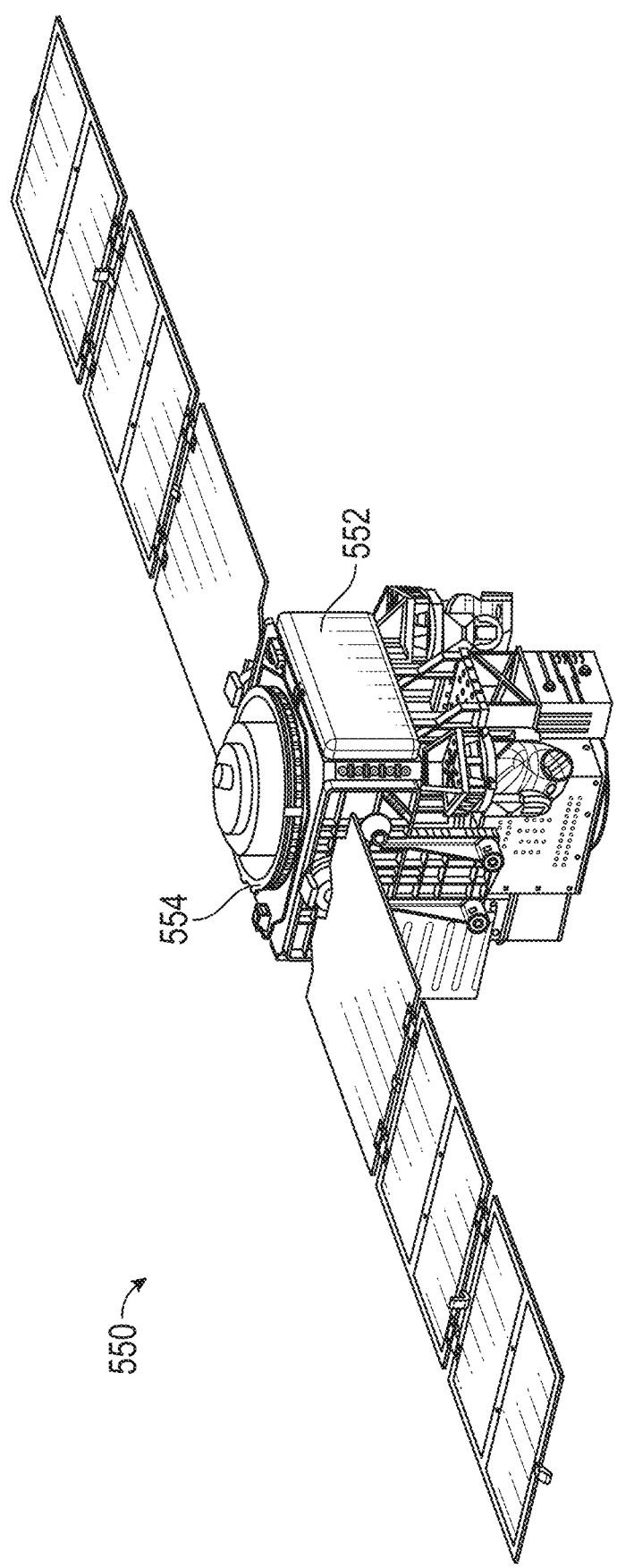
FIG. 5A is a schematic illustration of another configuration of a space debris capture system as integrated into a space asset in accordance with an embodiment of the present disclosure, shown in a stowed state.
Figure 5B:
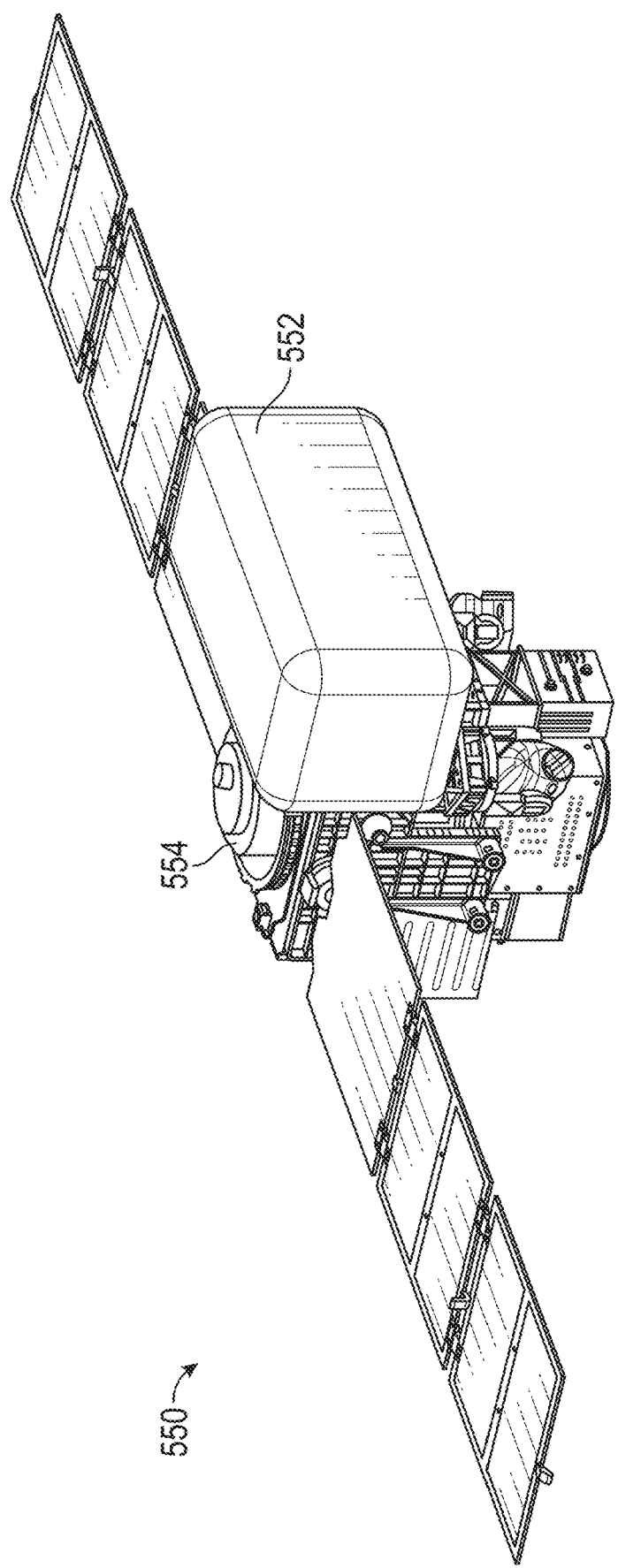
FIG. 5B illustrates the space debris capture system in a deployed state and attached to the space asset shown in FIG. 5A.

Referring now to FIGS. 5A-5B, schematic illustrations of a space asset 550 in accordance with an embodiment of the present disclosure are shown, having an integrated or onboard space debris capture system 552. The space asset 550 may be a satellite (e.g., as shown), a manned spacecraft, a scientific instrument, or the like, as will be appreciated by those of skill in the art. The space asset 550 may include one or more sensitive components 554, such as control and/or communication modules, habitats occupied by humans, scientific modules, or the like. The onboard space debris capture system 552 is mounted to the space asset 550 at a location proximate the sensitive components 554 and is configured to deploy from a stowed state (FIG. 5A) to a deployed state (FIG. 5B). Although shown with a single space debris capture system 552 arranged onboard the space asset 550, it will be appreciated that multiple space debris capture systems may be arranged about the space asset at one or more locations in order to provide protection to one or more desired regions of the space asset.

The onboard space debris capture system 552 may be formed similar to the standalone space debris capture systems shown and described above. More specifically, the onboard space debris capture system 552 includes an outer assembly and an inner assembly. The inner assembly is constructed of primary and secondary members, with the primary members having the same geometric shape as the outer assembly, and the secondary members being arranged at angles to the surfaces of the primary members (e.g., skew, orthogonal, etc.). The expansion and deployment of the onboard space debris capture systems may be similar to that shown and described above. For example, a set of dispensers may be distributed about an inner surface of the outer assembly. These dispensers may be configured to dispense or inject gas or foam into a separation gap between inner and outer membranes of the outer assembly.

As described above, the deployment of the space debris capture systems may be achieved using gas and/or foam. In the case of a foam, multiple dispensers may be arranged to inject foam into the separation gap between the outer and inner membranes of the outer assembly. As the foam expands, it will fill the volume of the separation gap and exert a net outward force on the flexible material of the outer assembly (inner and outer membranes). This net outward force will cause the outer assembly to assume a desired or intended geometric shape (e.g., spherical, cubic, ovoid, etc.). The foam may then self-cure and assume a substantially rigid structure that supports the outer membrane and is contained between the outer membrane and the inner membrane of the outer assembly.

In the case of gas, the outer membrane of the outer assembly may be formed of a metal-composite material, such as aluminum bonded to a thin sheet of polyester film (e.g., biaxially-oriented polyethylene terephthalate). As the gas is dispensed from the dispensers, the gas will apply a net outward force to inflate the material and structure of the outer assembly. The outermost layer of the outer assembly may include the metallic composition which may be selected to maintain its shape after expansion due to being strain-rigidized upon full inflation. As such, constant internal pressure may not be required once the outer assembly is deployed.

In either case of deployment, as the outer assembly is expanded and deployed from a stowed state to a deployed state, the outer assembly will apply force upon the inner assembly to deploy the structure of the inner assembly within the outer assembly. As the inner assembly is deployed within the outer assembly, the inner assembly will define a set of cells that are defined between layers or sheets of material of primary and secondary members. The primary members are shaped to be similar to that of the outer assembly, thus forming a set of parallel sheets of material, with spacing or gaps between the layers of materials. As such, if a projectile or other space debris object impacts the outer assembly and passes through the inner membrane of the outer assembly, it will then interact with (e.g., be captured by or pass through) the inner layers of the primary members. The secondary members are arranged as sheets of material that are angled relative to the surfaces of the primary members, and thus the angle of incidence of the projectiles may not negatively affect the ability of the space debris capture system to capture the space debris and particles thereof.

In accordance with embodiments of the present disclosure, three-dimensional space debris shields are provided. The three-dimensional nature is achieved by the inclusion of inner and outer assemblies, with the inner assembly configured to form a set of cells or voids. The layers or sheets of material of the inner assembly are not mutually parallel, resulting in the creation of the cells, and sets of walls at various different angles and orientations. The space debris capture systems, in accordance with embodiments of the present disclosure, include an inner assembly formed of a set of nested elements (i.e., primary members of inner assembly) that are the same shape or geometry as the outer assembly. This arrangement results in a series of parallel levels. The inner assembly further includes multiple non-parallel planar layers (i.e., secondary members of inner assembly) which are arranged to intersect with surfaces of the primary members. The resulting internal three-dimensional structure can lessen or eliminate dependence of shield effectiveness on an angle of incidence of a space debris object and may increase the number of layers through which incident particles will pass and/or interact with, resulting in higher effect capture rate of such particles.

In accordance with embodiment of the present disclosure, and particularly the standalone configuration(s) (e.g., FIGS. 3A-3F; 4A-4E), the inner membrane may be made from woven textile materials, such as aramid fibers. The purpose of such inner membrane is to capture fragments of space debris before the fragments exit the space debris capture system (e.g., puncturing an outer layer from the inside of the space debris capture system). In the standalone version, the outermost layer may be formed of such materials in order to guarantee that a particle encounters the material layer twice: once on impact or entry and a second time on an inner surface of a layer to prevent exit. Some or all of the other layers of the space debris capture system are arranged and provided to break up incident particles into a shower of smaller particles. Such internal layers may be formed from woven ceramic (e.g., alumina-boria-silica fibers) fabric to break up space debris particles as the particles travel through and interact with the various layers of material of the space debris capture system.

In the space asset-deployed version, where the shield is an integral part of a space asset (e.g., FIGS. 5A-5B), a similar architecture may be employed. For example, because the deployed space debris capture system (e.g., shield) will be backed by some portion of the space asset (e.g., satellite), the space debris capture system need not be designed for capture from any/all direction(s), but may be arranged to provide capture and protection from the hemisphere facing away from the space asset and in which the space debris capture system is deployed. In such configuration, one or more layers of aramid fiber fabric and/or some other fragment-capturing material may be provided on and parallel to the wall adjacent to the space asset, in order to prevent any debris from exiting the space debris capture system and impacting the protected space asset.

In accordance with embodiments of the present disclosure, a distributed dispenser system is provided for deploying the space debris capture systems from a stowed state to a deployed state. The distributed dispenser system includes a number of individual dispensers distributed about the outer assembly. In the illustrative embodiments, the dispensers are arranged on an inner surface of the outer assembly, although in other configurations the dispensers may be arranged on an outer surface of the outer assembly or may be directly housed within the separation gap between the outer membrane and the inner membrane. The dispensers may be configured to operate based on external environmental conditions, preset conditions, instructions, or timing, or may be controlled by an onboard control unit, a control unit of an associate space asset, or remotely controlled from an associated space asset or from the Earth. The distributed set of dispensers can eliminate a need for a centralized foam storage and multiple foam distribution hoses, which increase the weight, packaging volume, and complexity of the system. Additionally, such distributed set of dispensers will minimize the distance between the dispensing location and a volume to be filled by the dispensed material, thus improving uniformity and distribution of the dispensed material. As described above, the dispensed material may be a gas, a foam, or a combination of gas and foam. The gas may be an inert gas that may be easily stored and controlled for dispensing. The foam may be selected to be an expanding foam and/or a self-curing foam. In either case, the expansion of the dispensed material may cause the outer assembly to become strain-rigidized, such that continuous outward pressure is not required once fully inflation or full deployment is achieved.

The dispensed material may be dispensed into a separation gap between layers of the outer assembly, such as between an outer membrane and an inner membrane. In accordance with some embodiments, the cells of the inner assembly may also be filled with a foam, which can provide additional structural support and rigidity to the space debris capture systems and may also provide for increased space debris capture capabilities. That is, in accordance with some embodiments, the cells within the space debris capture systems (e.g., cells 334, 434) may be filled with an expandable and/or self-curing foam. In still further embodiments, in some cases, a subset or select number of the cells may be filled with a foam material. For example, in configurations with a central core having a control module or the like, the cells immediately around the core may be supplied with foam material to provide an extra level of protection for the sensitive components of the space debris capture systems described herein.

As described above, the layers of the primary members are separated by standoff gaps. These standoff gaps may be relatively large, as compared to conventional Whipple Shields and the like. Such large standoff gaps can achieve a large distribution of particle fragments from one layer to be distributed over a large area before impacting the next layer, thus reducing the areal density of the incident kinetic energy and increasing the ability of the next layer to stop or slow the individual fragments. Accordingly, such configurations can also reduce the areal density of the inner membrane and/or the areal density of the primary members of the inner assembly, thus reducing overall shield mass further.

The disclosed space debris capture systems may be configured as standalone space assets or may be integrated into other space assets, either permanently attached or deployable from such other space assets. The space debris capture systems may be launched directly and deployed from a launch vehicle and then maneuver to a desired location/altitude/orbit using onboard thrusters and other control/maneuvering components. In other configurations, one or more space debris systems, as described herein, may be deployable from a space asset, such as a single satellite that is configured to deploy multiple space debris capture systems, which may then become standalone space assets. In still further configurations, the space debris capture systems may be mounted to, attached to, or otherwise operated in conjunction with another space asset, such as a satellite, a scientific instrument, or a habitat or spacecraft for carrying humans. Accordingly, embodiments of the present disclosure may be employed as an integral satellite subsystem in which the shield deploys in orbit, enabling large-volume shields with significant standoffs between layers with little additional payload volume. Accordingly, advantageously, improved space debris capture systems are provided.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A space debris capture system comprising:
   an outer assembly configured to be deployed from a stowed state to a deployed state, the outer assembly comprising:
      an outer membrane; and
      an inner membrane,
      wherein, in the deployed state, the outer membrane is separated from the inner membrane by a separation gap; and
   an inner assembly arranged within the inner membrane of the outer assembly, the inner assembly formed of a plurality of sheets of material arranged at a plurality of orientations relative to the inner membrane and defining a plurality of cells within the outer assembly when in the deployed state, wherein a first group of the cells are defined within surfaces of the plurality of sheets of material and a second group of cells are defined between the surfaces of the inner assembly and an inner surface of the inner membrane;
   wherein the space debris capture system is configured to capture space debris.

2. The space debris capture system of claim 1, wherein the inner assembly comprises:
   at least one primary member; and
   a plurality of secondary members, wherein the secondary members each comprise a planar sheet of material that extends, at least, between the at least one primary member and the inner membrane of the outer assembly, wherein each secondary member is arranged at an angle relative to a surface of the at least one primary member along a line of contact between the respective secondary member and the at least one primary member,
   wherein, in the deployed state, the at least one primary member is separated from the inner membrane by a standoff gap.

3. The space debris capture system of claim 2, wherein the outer assembly and the at least one primary member have a spherical shape.

4. The space debris capture system of claim 2, wherein the outer assembly and the at least one primary member have a cubic shape.

5. The space debris capture system of claim 2, wherein each secondary member is arranged orthogonal to a surface of the at least one primary member along a line of contact between the respective secondary member and the at least one primary member.

6. The space debris capture system of claim 1, wherein the inner assembly comprises a plurality of primary members arranged in a nested arrangement within the outer assembly, wherein each primary member has substantially the same shape as the outer assembly.

7. The space debris capture system of claim 6, wherein each primary member of the plurality of primary members is separated from an adjacent primary member by a standoff gap.

8. The space debris capture system of claim 1, further comprising a dispensing system configured to dispense material into the separation gap to apply an outward force and expand the outer assembly into the deployed state.

9. The space debris capture system of claim 8, wherein the dispensing system comprises a plurality of dispensers distributed about the outer assembly and arranged in fluid communication with the separation gap.

10. The space debris capture system of claim 8, wherein the dispensing system is configured to dispense a gas into the separation gap to apply the outward force to expand the outer assembly into the deployed state.

11. The space debris capture system of claim 10, wherein the outer membrane comprises a material that becomes strain-rigidized upon expansion to the deployed state.

12. The space debris capture system of claim 8, wherein the dispensing system is configured to dispense a foam into the separation gap to apply the outward force to expand the outer assembly into the deployed state.

13. The space debris capture system of claim 1, further comprising a control module arranged at a center of the inner assembly, the control module comprising at least one of control electronics and communications components.

14. The space debris capture system of claim 1, further comprising at least one thruster arranged on an outer surface of the outer assembly.

15. The space debris capture system of claim 14, wherein the at least one thruster is mounted on a respective thruster support.

16. The space debris capture system of claim 15, wherein the thruster support is a telescoping element configured to extend during expansion to the deployed state.

17. The space debris capture system of claim 1, further comprising a space asset, wherein the outer assembly is attached to the space asset.

18. The space debris capture system of claim 1, further comprising at least one solar panel arranged on an exterior surface of the outer membrane.

19. The space debris capture system of claim 1, further comprising at least one antenna arranged on an exterior surface of the outer membrane.

20. The space debris capture system of claim 1, further comprising a supply container housing a supply of material to be used to deploy the outer assembly from the stowed state to the deployed state.

\* \* \* \* \*